US012739282B2

(12) United States Patent
Copty et al.

(10) Patent No.: US 12,739,282 B2
(45) Date of Patent: Sep. 15, 2026

(54) PROACTIVELY DETERMINING SECURITY RISKS AND DEPLOYMENT IMPACTS ACROSS CLOUD COMPUTING ENVIRONMENTS

(71) Applicant: Microsoft Technology Licensing, LLC, Redmond, WA (US)

(72) Inventors: Fady Copty, Haifa (IL); Aviv David Eldan, Givatayim (IL); Asaf Nakash, Yavne (IL); Yoav Saroya, Rishon Lezion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 18/930,621

(22) Filed: Oct. 29, 2024

(65) Prior Publication Data

US 2026/0122109 A1 Apr. 30, 2026

(51) Int. Cl.
*H04L 9/40* (2022.01)

(52) U.S. Cl.
CPC .................................... *H04L 63/20* (2013.01)

(58) Field of Classification Search
None
See application file for complete search history.

(56) References Cited

U.S. PATENT DOCUMENTS 10,929,531 B1 2/2021 Kenemer
2012/0159180 A1 6/2012 Chase et al.
2013/0067090 A1 3/2013 Batrouni et al.
2015/0040217 A1 2/2015 Abuelsaad
2018/0132105 A1 5/2018 Nealis
2018/0276396 A1 9/2018 Yablokov
2023/0161614 A1 5/2023 Raaz
2023/0208882 A1* 6/2023 Crabtree ............. H04L 63/1408 726/22
2023/0319081 A1* 10/2023 Fainberg ............. H04L 63/1433 726/22
2024/0064174 A1* 2/2024 Molzon ................... H04L 63/10

(Continued)

OTHER PUBLICATIONS

Dissi, “Mapping the Cyber Terrain: the Indispensable Role of Network Topology in Cybersecurity Strategy”, Linkedin (Year: 2023).*

(Continued)

*Primary Examiner* — Boris D Grijalva Lobos
(74) *Attorney, Agent, or Firm* — Ray Quinney & Nebeker P.C.; Christopher K. Hallstrom

(57) ABSTRACT

This disclosure describes a proactive deployment impact system that detects and addresses the security impact of candidate code-based infrastructure changes before they are deployed in a production environment within a cloud computing system. The proactive deployment impact system implements a lightweight preemptive security framework, based on runtime resource information, to determine whether a requested candidate code-based infrastructure change would introduce new security risks, attack patterns, or breach vulnerabilities. Furthermore, the proactive deployment impact system can actively block the deployment of negatively impacting candidate changes, report potential security breaches, and/or automatically modify the candidate changes to eliminate security vulnerabilities.

20 Claims, 9 Drawing Sheets

(56) References Cited

U.S. PATENT DOCUMENTS

2026/0087141 A1 3/2026 Bachmann

OTHER PUBLICATIONS

International Search Report and Written Opinion received for PCT Application No. PCT/US2025/038998, mailed on Nov. 4, 2025, 14 pages.

Notice of Allowance mailed on Jan. 6, 2025, in U.S. Appl. No. 18/893,284, 10 pages.

Notice of Allowance mailed on Mar. 3, 2026, in U.S. Appl. No. 18/893,284, 09 pages.

* cited by examiner

Security Map 400

| Source-Node ID 402 | Target-Node ID 404 | Source-Node Property 406 | Target-Node Properties 408 | Target Node Type 410 |
|---|---|---|---|---|
| A | B | Cloud Compute | Sensitive Data | Key Vault |
| X | Y | CVE | Sensitive Data | Storage Account |

Candidate Security Map 420

| Source-Node ID 402 | Target-Node ID 404 | Source-Node Property 406 | Target-Node Properties 408 | Target Node Type 410 |
|---|---|---|---|---|
| A | B | Cloud Compute | Sensitive Data | Key Vault |
| X | Y | CVE + Internet Exposure | Sensitive Data | Storage Account |

PROACTIVELY DETERMINING SECURITY RISKS AND DEPLOYMENT IMPACTS ACROSS CLOUD COMPUTING ENVIRONMENTS

BACKGROUND

In recent years, advancements in both hardware and software have significantly transformed cloud computing environments, enabling the use of code-based infrastructure to provide scalable resources and services. One benefit of using code-based infrastructure is the ability to modify various components and resources through patches and change requests. For instance, a developer might submit a change request to modify portions of the infrastructure by updating one or more resources. However, modifications to one resource can inadvertently introduce unanticipated vulnerabilities to other resources. These vulnerabilities can impact a cloud computing environment by introducing security risks, such as best practice violations or exposing sensitive data. Indeed, due to the extensive relationships and interconnections between nodes and resources in a cloud computing environment, coupled with limited visibility of the full environment, systems and users that provide change requests commonly struggle to assess the broader impact of their changes. These issues, among others, exist in current cloud computing environments.

BRIEF DESCRIPTION OF THE DRAWINGS

The following detailed description provides specific and detailed implementations accompanied by drawings. Additionally, each of the figures listed below corresponds to one or more implementations discussed in this disclosure.

FIGS. 4A-4D illustrate example diagrams of security maps and pattern-based data structures based on requested candidate code-based infrastructure changes.

DETAILED DESCRIPTION

Figure 1:
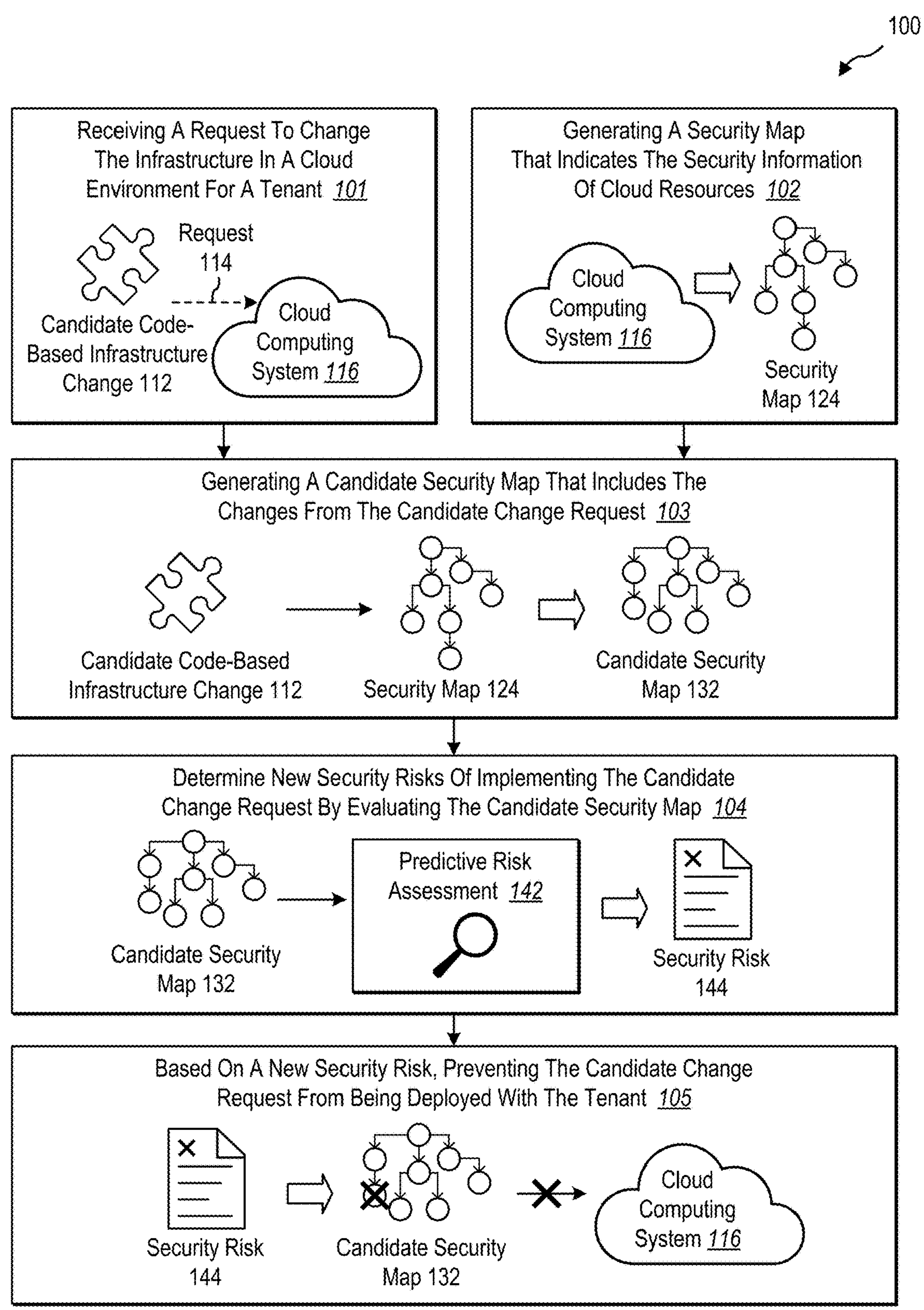
FIG. 1 illustrates an example overview of implementing the proactive deployment impact system to determine and prevent security threats that could arise from implementing requested candidate code-based infrastructure changes in a production cloud environment of a cloud computing system.

This disclosure describes a proactive deployment impact system that detects and addresses the security impact of candidate code-based infrastructure changes before they are deployed in a production environment within a cloud computing system. The proactive deployment impact system implements a lightweight preemptive security framework that incorporates runtime resource information to determine whether a requested candidate code-based infrastructure change could introduce new security risks, attack patterns, or breach vulnerabilities. Furthermore, the proactive deployment impact system can proactively protect the cloud computing system by blocking the deployment of harmful candidate changes, reporting potential security breaches, and/or automatically modifying the candidate changes to eliminate security vulnerabilities.

Accordingly, implementations of the present disclosure provide benefits and solve problems in the art with systems, computer-readable media, and computer-implemented methods that utilize a proactive deployment impact system that detects and addresses the security impact of candidate code-based infrastructure changes based on runtime resource properties and relationships. As described below, the proactive deployment impact system predicts the impact of potential deployments by representing candidate changes in a code-based infrastructure format, generating security maps or graphs indicating potential security characteristic changes, and determining new potential risks within the cloud computing system based on the security maps. Additionally, because the proactive deployment impact system is lightweight and executes in real time, the system can identify resource breaches and vulnerabilities before deployment and more quickly than existing systems.

To elaborate, consider this example of the proactive deployment impact system preventing resource breaches in a cloud computing system. Based on receiving a cloud resource deployment request ("request") with a candidate code-based infrastructure change ("candidate change") to a cloud infrastructure environment, the proactive deployment impact system generates a security map of a target portion (e.g., a tenant) of the cloud infrastructure environment, where the security map indicates security information of the target portion. In addition, based on the candidate change, the proactive deployment impact system generates another security map, a candidate security map, by merging security information from the candidate code-based infrastructure change with runtime information from the first security map.

Next, the proactive deployment impact system determines a security risk based on performing a security pattern analysis on one or more breach patterns generated from the candidate security map. Based on the security pattern analysis, the proactive deployment impact system can prevent the request from deploying in the cloud infrastructure environment when certain security risks are determined. In some instances, the proactive deployment impact system provides a security notification indicating that deploying the candidate change will result in a negative security risk profile change. In some implementations, the proactive deployment impact system prevents the deployment of candidate changes that have a harmful security impact.

Stepping back for some context, many cloud computing systems provide a variety of services and applications to users. These tools and services are supported by a backend code-based infrastructure, known as infrastructure-as-code (IaC). Code-based infrastructure enables cloud environment providers to efficiently share the same physical resources (e.g., hardware devices) among clients and entities. To prevent any crossover or overlap, a cloud computing system typically organizes the code-based infrastructure and cloud-based resources into tenants, resource groups, and/or subscriptions.

However, the use of code-based infrastructure and shared resources also introduces security risks. For instance, vulnerabilities in a code-based infrastructure tool could potentially serve as an entry point or gateway for threats to the core infrastructure. In particular, a new resource may allow for external access, which may be of little consequence to the new resource. However, if the new resource is directly or indirectly connected to more significant resources, such as a resource with sensitive information, implementing the new resource exposes the sensitive information to outside users. Indeed, many existing systems allow security risks to be introduced due to providing limited impact visibility for a set of candidate changes.

Similarly, misconfigurations in code-based infrastructure changes could inadvertently expose sensitive data or create openings for attacks. Unauthorized entry into cloud resources in a cloud computing system is referred to as a resource breach. The severity of security threats escalates when a resource breach not only compromises the core of the cloud computing system but also provides access to other subscriptions, resource groups, or tenants within the system.

In the context of security resource breaches, understanding the concepts of breach paths, pivots, and blast radii is crucial to mitigating security risks. As an example, a breach path refers to a sequence or chain of cloud resources, starting at an exploited resource, that an attacker navigates to reach a pivot resource. A pivot is a cloud resource within the cloud computing system that enables access to cloud resources through lateral movement and connections. For example, a pivot resource allows an attacker to access other parts of the system, escalate their privileges, and reach more sensitive data. A blast radius refers to the extent of potential damage or disruption caused by a security breach. It encompasses all the resources that could be affected directly or indirectly. The larger the blast radius, the more significant the potential impact of a breach.

While some existing cloud infrastructure security systems identify resource breaches caused by newly implemented code-based infrastructure templates, these security threats are identified, at best, hours after the new code-based infrastructure is activated and running. Furthermore, many existing cloud infrastructure security systems can only determine security threats in newly implemented code-based infrastructure based on performing a security scan of most or all of the cloud computing system, which requires significant time and computing resources to evaluate an entire production environment.

As described in this disclosure, the proactive deployment impact system provides several significant technical benefits in terms of improved computing security and efficiency compared to existing cloud infrastructure security systems. Moreover, the proactive deployment impact system provides several practical applications that address problems related to identifying and preventing resource breaches introduced in cloud computing systems when deploying or binding new or updated code-based infrastructure changes.

In contrast to existing systems, the proactive deployment impact system detects and addresses potential resource breaches in candidate code-based infrastructure changes before changes are deployed or binding occurs in a production environment within a cloud computing system. For example, the proactive deployment impact system accurately and proactively assesses the security impact of candidate code-based infrastructure changes in real time before they are deployed, which eliminates or minimizes security threats. In addition, the proactive deployment impact system can generate and/or apply mitigation changes to prevent security breaches caused by newly deployed candidate changes.

In many implementations, the proactive deployment impact system may operate as an integrative solution before deployment to ensure that the requested deployment packages, templates, and/or changes do not introduce additional risks to the production environment. Indeed, the proactive deployment impact system maps a candidate deployment to a cloud environment based on current runtime security information, allowing it to predict the security impact of deploying a requested change. By doing so, the proactive deployment impact system accurately determines the true security impact of the candidate changes concerning security risks, attack paths, network topologies, and identity topologies of a cloud computing system.

To elaborate, in various implementations, the proactive deployment impact system generates a security map of a portion of a cloud computing system, such as for a tenant or a subscription, which indicates the security information (e.g., security properties, contexts, and characteristics) of the portion. The security map is a lightweight data structure that indicates the security information (e.g., security properties, contexts, and characteristics) of the portion, including resources. The proactive deployment impact system then generates a candidate security map by merging the effects of the candidate changes with current runtime security information from the security mapping. By generating and analyzing the candidate security map, the proactive deployment impact system can efficiently determine potential security risks introduced by the candidate changes in real time that could be introduced by deploying the changes.

As mentioned above, the proactive deployment impact system identifies potential security risks based on determining how requested candidate changes would affect the runtime environment of the cloud computing system. In contrast, existing systems would likely fail to identify how implementing the changes will affect currently active cloud resources in the cloud computing system that are directly or indirectly related to the changes. Unlike existing systems, the proactive deployment impact system can accurately determine security risks that would otherwise go undetected before deployment and often for many hours after deployment. In various implementations, the proactive deployment impact system identifies all of the cloud resources that are impacted by the candidate changes using the candidate security map. By creating candidate security graphs that accurately indicate the security information of cloud resources, the proactive deployment impact system can determine when a requested change will affect access to secret information (e.g., sensitive data), user identities, or other restricted information.

In various implementations, the proactive deployment impact system runs a security pattern analysis on the candidate security map to assess the full effects of deploying the candidate code-based infrastructure changes. Because the candidate security map is a lightweight model, which is a fraction of the size of the production environment, the proactive deployment impact system identifies security threats more quickly and efficiently as well as with high precision, as further described below. Similarly, because the candidate security map includes current runtime security information, the proactive deployment impact system more accurately determines security risks, including risks that would not be detected by analyzing the candidate changes alone.

As illustrated in the foregoing discussion, this disclosure utilizes a variety of terms to describe the features and advantages of the proactive deployment impact system. To illustrate, this disclosure describes the proactive deployment impact system in the context of a cloud computing system. As an example, the term "cloud computing system" refers to a network of interconnected computing devices that provide various services and applications to computing devices (e.g., server devices and client devices) inside or outside of the cloud computing system. An example of a cloud computing system is described below in connection with FIG. 2.

In addition, the term "cloud infrastructure environment" refers to a cloud computing system environment where code-based infrastructure (e.g., information as code ("IaC")) resources provide products and services used by end users. In various implementations, a cloud infrastructure environment is a production environment that provides live, active services to systems and users. Often, a cloud infrastructure environment includes several tenant operations. A cloud infrastructure environment also includes active cloud resources currently implemented with one or more parameter sets.

In this document, the term "cloud resource deployment request" ("request") refers to a call to the cloud computing system to modify or provision a portion of the cloud infrastructure environment. For example, the request to modify a portion of the cloud computing system architecture and/or resource usage. A request may be received from another part of the proactive deployment impact system, another system, or a computing device associated with a user. In various implementations, a request includes a candidate code-based infrastructure change.

In addition, the term "code-based infrastructure change" ("change") refers to a code-based data structure or file that, when deployed into a cloud environment, defines the infrastructure and configuration of a cloud-based application or project. A change is used to define and provision infrastructure resources necessary to support cloud-based applications. Depending on the type, a change is provided as a code-based infrastructure template, which includes built-in parameters defining how infrastructure and/or resources should be provisioned when deployed.

In this document, a code-based infrastructure change is often a candidate change (i.e., a candidate code-based infrastructure change), which includes a change that is not deployed until it has been determined not to raise the security risk profile of the cloud computing system (e.g., the deployment will not negatively change or affect the security risk profile). As an example, the term "candidate change" refers to a change (e.g., an IaC template) that is ready to be deployed or bound into a production environment of a cloud computing system. The term "candidate cloud infrastructure resources" ("candidate resources") refers to resources within the change to be deployed. Similarly, the term "candidate parameters" refers to parameters associated with a candidate change that specify how to provision the candidate resources upon deployment.

The term "security map" refers to a data structure that includes security information of a set of cloud resources within a cloud infrastructure environment. In various instances, security information includes security properties, security contexts, security characteristics, and/or security risks of cloud resources, often represented with corresponding nodes and edges. A security map reflects the security risks currently within the cloud infrastructure environment. Security risks can include common vulnerabilities and exposures (CVEs), data security classifications (e.g., sensitive data or secrets), critical user properties, protected data detected in a workload, source-code management system misconfigurations, and/or vulnerabilities. In various implementations, a map is a lightweight model, schema, or mapping limited to security information, including runtime information, rather than a fuller model of resources and resource properties included in a cloud computing system.

In many implementations, a security map corresponds to a segment of a cloud infrastructure environment, such as corresponding to a tenant or subscription of the cloud infrastructure environment (or a portion of a segment). In various implementations, a security map is stored in a database, such as a security graph or map database. In addition, in some implementations, a security map includes connections to external resources and/or devices, such as devices or identities that have access to resources within the cloud computing system.

The term "candidate security map" refers to a security map that has been updated based on the candidate changes. For example, a candidate security map includes runtime security information and security risks for a target segment or portion of the cloud infrastructure environment hypothetically modified by the candidate change. Indeed, a candidate security map refers to the potential security information and security risks within a non-production version of the cloud infrastructure environment that implements the candidate changes.

In this document, the term "pattern-based data structure" refers to resources within a candidate change and/or cloud environment represented as patterns in a file or other data structure. For example, the pattern-based data structure is a network graph that represents infrastructure resources as nodes and properties or connections between resources as edges. In some implementations, the pattern-based data structure is a matrix or flat file. In general, a pattern-based data structure allows the proactive deployment impact system to perform a security pattern analysis to detect resource vulnerability patterns. A pattern-based data structure includes paths, such as breach paths and attack paths.

The term "resource vulnerability pattern" refers to a sequence or chain of infrastructure resources that are associated with vulnerabilities or misconfigurations. These vulnerabilities or misconfigurations can potentially be exploited by an attacker to gain unauthorized access or escalate privileges. In some cases, a resource vulnerability pattern identifies a vulnerable entry point that is connected to additional resources in a specific pattern. Attackers can exploit this pattern to gain unauthorized access to the cloud computing system. In the context of breach path analysis (i.e., security pattern analysis), a resource vulnerability pattern represents a possible breach path (e.g., resource vulnerability graph pattern) and may include a pivot resource.

Additional example implementations and details of the proactive deployment impact system are discussed in connection with the accompanying figures, which are described next. For instance, FIG. 1 illustrates an example overview of implementing the proactive deployment impact system to determine and prevent security threats that could arise from implementing requested candidate code-based infrastructure changes in a production cloud environment according to some implementations. FIG. 1 includes a series of acts 100 performed by the proactive deployment impact system within a cloud computing system. While the series of acts 100 provides a high-level overview of the proactive deployment impact system, additional details are provided in connection with subsequent figures.

As shown, the series of acts 100 includes act 101 of receiving a request to change the infrastructure in a cloud environment for a tenant. For example, the proactive deployment impact system receives a request 114 with a candidate code-based infrastructure change 112 requesting the provisioning or modification of a cloud computing system 116. Before deploying the candidate code-based infrastructure change 112, the proactive deployment impact system determines how the candidate changes impacts the security profile of the cloud computing system 116, as further discussed below.

Act 102 includes generating a security map that indicates the security information of cloud resources. For example, the proactive deployment impact system generates a security map 124 of a segment or portion of the cloud computing system 116, such as a security map of a tenant or a portion of a tenant. As mentioned, the security map includes the security information and security risks of the corresponding cloud resources of the cloud computing system 116. Further, the security map is a lightweight model or mapping of a target portion of the cloud computing system 116 focusing on security information. In various implementations, the proactive deployment impact system performs act 102 before or concurrent with act 101.

Act 103 includes generating a candidate security map that includes changes from the candidate change request. As shown, the proactive deployment impact system receives the candidate code-based infrastructure change 112 and applies it to the security map 124 to generate a candidate security map 132. As provided further below, the proactive deployment impact system generates a candidate security map 132 that merges the candidate changes with runtime security information form the security map, which is used to predict how the candidate changes will impact the security profile of the cloud computing system 116.

Act 104 includes determining new security risks of implementing the candidate change request by evaluating the candidate security map. At a high level, the proactive deployment impact system compares the candidate security map 132 against a predictive risk assessment 142 to determine a security risk 144. In various implementations, the proactive deployment impact system performs a security pattern analysis on one or more pattern-based data structures generated from the candidate security map to determine security risks, as further described below.

Act 105 includes preventing the candidate change request from being deployed within the tenant based on the new security risk. For example, the proactive deployment impact system blocks or returns the candidate security map 132 from deploying in the cloud computing system 116 based on determining the security risk 144. In various implementations, based on the criticality of the security risk 144, the proactive deployment impact system may provide a notification and/or allow the candidate change to be deployed. In some instances, the proactive deployment impact system suggests modifications to the candidate change to reduce or eliminate the new security risk, as further described below.

As mentioned, the proactive deployment impact system can utilize security maps and predictive risk assessments to quickly determine how candidate changes affect the cloud infrastructure environment of a cloud computing system. By doing so, the proactive deployment impact system can accurately and efficiently determine whether to block or allow a candidate change from being deployed based on how the candidate change will impact the security risk profile of the cloud computing system (e.g., the deployment be blocked if it is determined to negatively change or affect the security risk profile).

Figure 2:
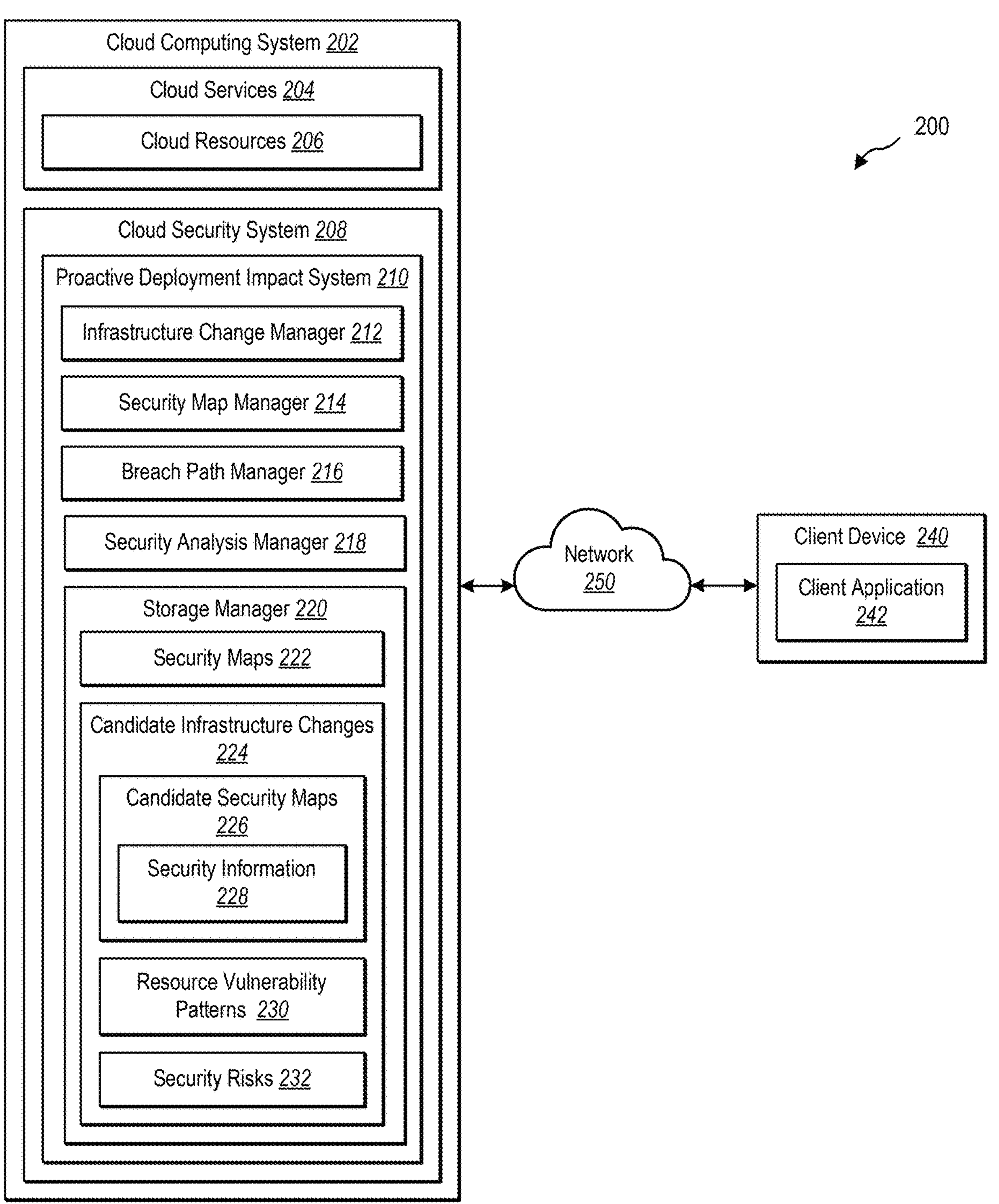
FIG. 2 illustrates an example computing environment of a cloud computing system where a proactive deployment impact system is implemented.

With a general overview in place, additional details are provided regarding the components, features, and elements of the proactive deployment impact system. In particular, FIG. 2 illustrates an example computing environment where a proactive deployment impact system is implemented in a cloud computing system according to some implementations. Later figures provide examples of various functions performed by the proactive deployment impact system.

As shown in FIG. 2, the proactive deployment impact system 210 operates within a computing environment 200 that includes a cloud computing system 202. The cloud computing system 202 includes various systems, including the proactive deployment impact system 210. In some instances, the cloud computing system 202 represents a MICROSOFT AZURE® cloud computing system. While FIG. 2 shows example arrangements and configurations of devices and systems, other arrangements and configurations are possible.

As shown, the computing environment 200 includes a cloud computing system 202 that implements the proactive deployment impact system 210 and a client device 240 connected via a network 250. Many of these components may be implemented on one or more computing devices, such as on one or more server devices. Some of these components may be implemented on personal devices. Further details regarding computing devices are provided below in connection with FIG. 7, along with additional details regarding networks, such as the network 250 shown.

As shown, the cloud computing system 202 includes cloud services 204 and a cloud security system 208. In various implementations, the cloud services 204 represent the cloud infrastructure environment or production environment of the cloud computing system 202, which provides products and services for clients, end users, and/or systems. The cloud services 204 include cloud resources 206, which can include code-based infrastructure (e.g., IaC) resources. The cloud services 204 and cloud resources 206 may represent large portions of the cloud computing system 202 that facilitate tenants, resource groups, subscriptions, and other components of a production environment.

As also shown, the cloud computing system 202 includes the cloud security system 208. In various implementations, the cloud security system 208 manages various security aspects of the cloud computing system 202. For example, the cloud security system 208 manages identity and access management, data encryption, intrusion detection and prevention, firewalls, security information and event management, security audits, disaster recovery, access control, and authorization, among others.

As shown in FIG. 2, the cloud security system 208 includes the proactive deployment impact system 210. In some implementations, the proactive deployment impact system 210 is located on a separate computing device within the cloud computing system 202, separate from the cloud services 204 and/or the cloud security system 208. In some instances, the proactive deployment impact system 210 is located separately from the cloud computing system 202.

As mentioned earlier, the proactive deployment impact system 210 provides a framework that utilizes security graphs, pattern-based data structures, security pattern analysis, and resource vulnerability patterns to determine the security posture of a candidate code-based infrastructure change based on its potential impact on the surrounding infrastructure in the cloud infrastructure environment. As shown, the proactive deployment impact system 210 includes various components and elements implemented in hardware and/or software. For example, the proactive deployment impact system 210 includes an infrastructure change manager 212, a security map manager 214, a breach path manager 216, a security analysis manager 218, and a storage manager 220. The storage manager 220 includes security maps 222, candidate infrastructure changes 224, candidate security maps 226, security information 228, resource vulnerability patterns 230, and security risks 232, among other data that the proactive deployment impact system 210 may need to store and access.

The infrastructure change manager 212 can identify code-based infrastructure changes, including candidate infrastructure changes 224, submitted for deployment into the cloud computing system 202. In various implementations, the infrastructure change manager 212 manages obtaining, receiving, editing, forwarding, reformatting, modifying, and/or otherwise managing candidate infrastructure changes 224. For example, in some instances, the infrastructure change manager 212 formats a candidate infrastructure change into a code-based infrastructure format, such as a code-based infrastructure template. In some instances, the infrastructure change manager 212 receives candidate infrastructure changes 224 from systems or users requesting provisioning changes.

The security map manager 214 can generate security maps 222 for some or all of the cloud computing system 202. As mentioned, a security map can indicate security information about cloud resources 206 within the cloud computing system 202. Additionally, in some instances, the security map manager 214 can generate candidate security maps 226 for candidate infrastructure changes 224. For example, the security map manager 214 merges information from a candidate infrastructure change with a portion of a security map to generate a candidate security map, which provides security information 228 corresponding to the candidate infrastructure change based on its predicted deployment impact.

The breach path manager 216 can generate pattern-based data structures from the candidate security maps 226. In some instances, the pattern-based data structures are candidate pattern-based data structures generated from the candidate security maps. In various implementations, candidate pattern-based data structures include breach paths between a set of nodes connected via edges indicated in the candidate security map.

The security analysis manager 218 can determine security risks based on performing a security pattern analysis, such as breach path analytics, on the candidate pattern-based data structures to determine or identify resource vulnerability patterns 230. By determining or identifying one or more of the resource vulnerability patterns 230 in the candidate pattern-based data structures, the security analysis manager 218 can provide security risks 232 indicating detected threat levels, as described below. In various implementations, the security analysis manager 218 may also perform various additional security actions based on detecting resource vulnerability patterns 230.

As shown, the computing environment 200 includes the client device 240. In various implementations, the client device 240 is associated with a user (e.g., a user client device) or system, such as a user who is providing a candidate template for deployment to the proactive deployment impact system 210. In some implementations, the client device 240 includes a client application 242, such as a web browser, mobile application, or another form of computer application for accessing and/or interacting with the cloud computing system 202 and/or the proactive deployment impact system 210.

Figure 3:
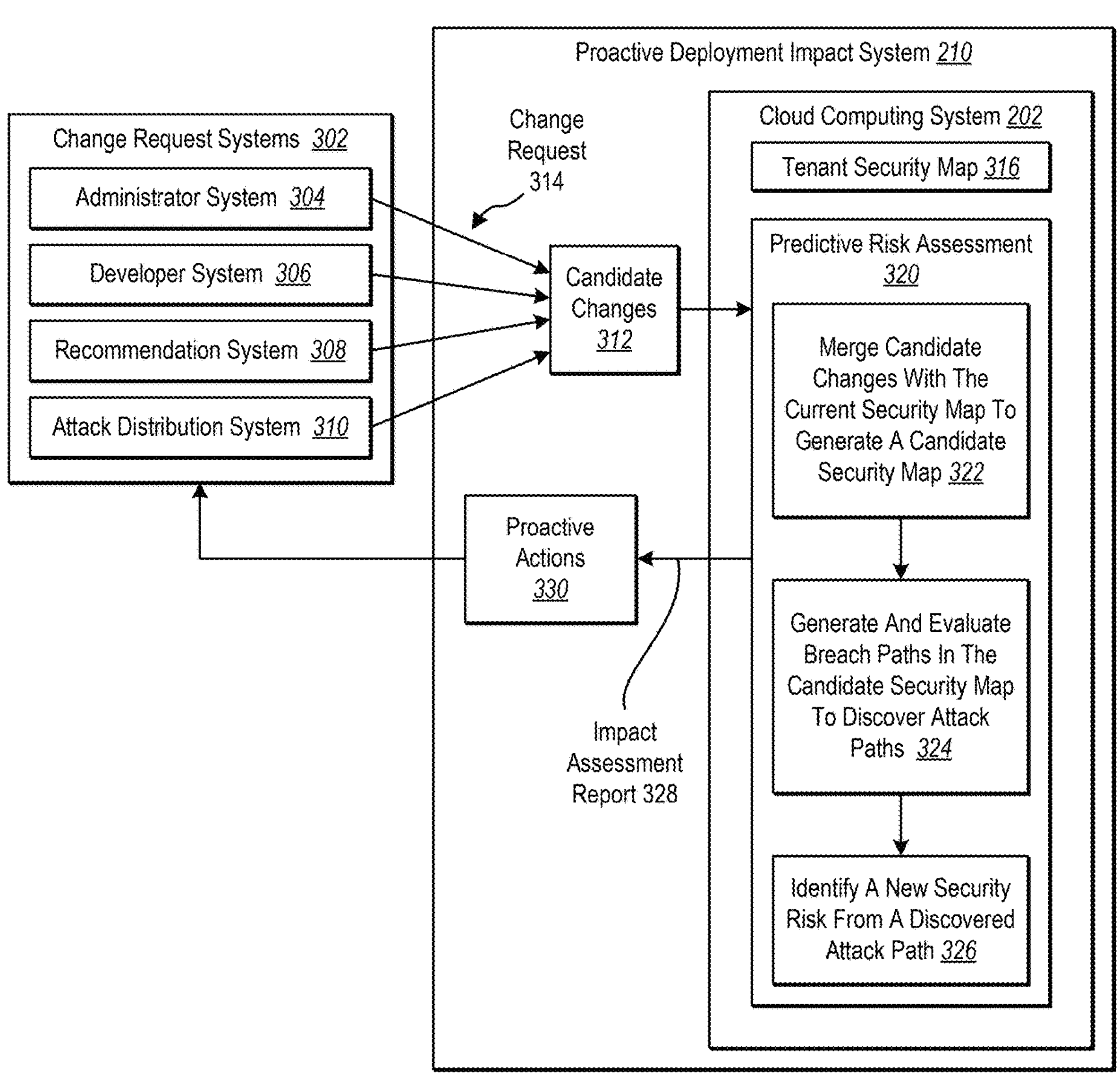
FIG. 3 illustrates an example high-level block diagram of the proactive deployment impact system performing predictive risk assessment to prevent security threats that could arise from implementing requested candidate code-based infrastructure changes.
Figure 4C:
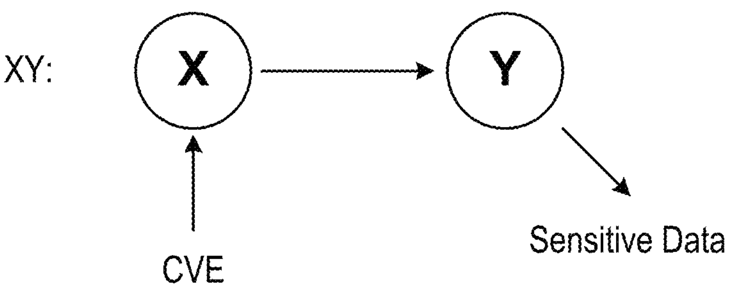
Figure 4D:
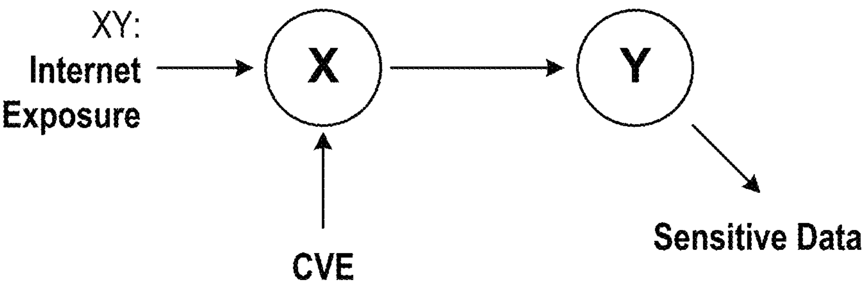
Figure 5:
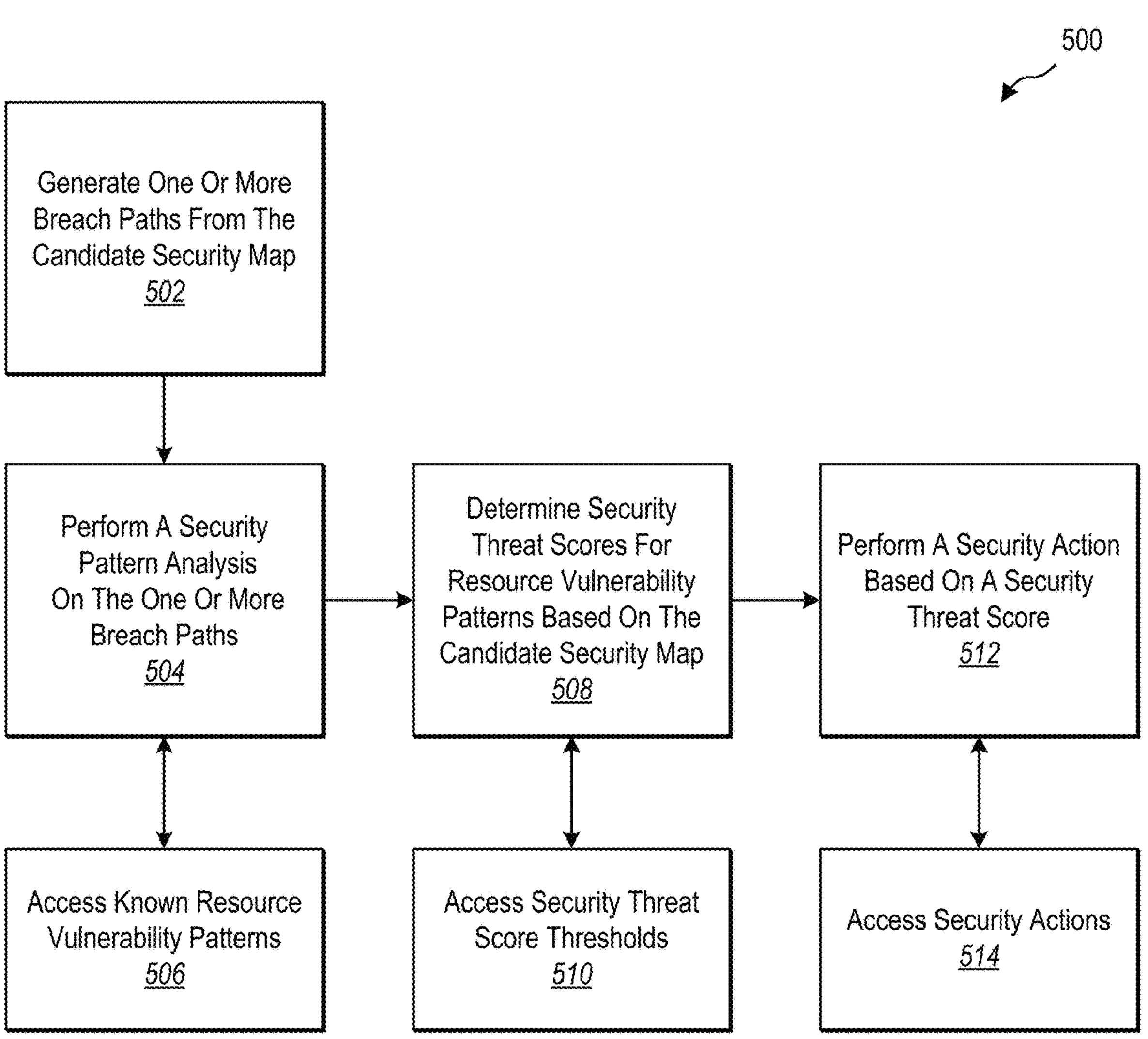
FIG. 5 illustrates an example diagram of preventing security resource breaches in a production cloud environment based on performing security pattern analysis on security graphs and pattern-based data structures.

FIG. 3 through FIG. 5 provide additional details about the proactive deployment impact system 210, which determines and prevents security threats caused by new code-based infrastructure changes before the security threats are implemented in a production cloud environment. For example, FIG. 3 provides additional details about the proactive deployment impact system, FIGS. 4A-4D provide additional details about security graphs and pattern-based data structures, and FIG. 5 provides additional details about performing security pattern analysis on the pattern-based data structures.

As mentioned above, FIG. 3 illustrates an example high-level block diagram of the proactive deployment impact system performing predictive risk assessment to prevent security threats that could arise from implementing requested candidate code-based infrastructure changes. Notably, FIG. 3 is used as an example to discuss how the proactive deployment impact system 210 can detect and prevent security issues.

As shown, FIG. 3 includes the proactive deployment impact system 210 receiving candidate changes 314 from change request systems 302, performing a predictive risk assessment 320, and providing proactive actions 330. In particular, the change request systems 302 include an administrator system 304, a developer system 306, a recommendation system 308, and an attack distribution system 310. In various implementations, the administrator system 304 is part of an identity and access management system for managing and securing user identities and information, controlling access to resources, and ensuring compliance with security policies. For example, the administrator system 304 provides a change for modifying role-based access controls (RBACs) of a resource associated with a tenant or subscription.

In one or more implementations, the developer system 306 is associated with a user who designs, implements, and manages cloud environments that support applications and services. For example, the developer system 306 provides changes that create, modify, and remove portions of the infrastructure. In some instances, the developer system 306 is associated with an integration and/or development pipeline that uses automated steps to streamline the process of delivering software by integrating and deploying (provisionally) code changes.

In various implementations, the recommendation system 308 is a cloud security posture management system that continuously monitors and assesses the security posture of cloud environments to identify and remediate vulnerabilities and misconfigurations. For example, the recommendation system 308 provides a change based on attempting to patch a security vulnerability.

In some implementations, the attack distribution system 310 includes a separate, isolated, and/or siloed system from other change request systems for improving change requests that introduce new security risks. For example, an attack distribution system 310 modifies a previously submitted change to allow the change to deploy without the new security risk and/or with a lesser security risk.

As mentioned, the proactive deployment impact system 210 can receive change requests 312 (e.g., cloud resource deployment requests) from the change request systems 302. In various implementations, the proactive deployment impact system 210 pre-processes a request to ensure the request is in a compatible format. For instance, the proactive deployment impact system 210 verifies that a change request is formatted as a code-based infrastructure (e.g., IaC) file. In some instances, the proactive deployment impact system 210 utilizes tools, services, or calls (e.g., application programming interface (API) calls) to configure the change request in a compatible format.

Upon obtaining change requests 312, the proactive deployment impact system 210 can store the candidate changes 314 from the requests. In some instances, the candidate changes 314 (e.g., an IaC representation of the changes) are stored in a directory or folder associated with the proactive deployment impact system 210.

In addition, the proactive deployment impact system 210 determines to which portion of the cloud computing system 202 the candidate changes 314 relate. As shown in FIG. 3, the proactive deployment impact system 210 includes the cloud computing system 202 having a tenant security map 316. In various implementations, the proactive deployment impact system 210 generates security maps of one or more segments or portions of the cloud computing system 202. For example, as shown, the proactive deployment impact system 210 generates a security map for a target tenant (e.g., the tenant security map 316).

As mentioned above, a security map includes security information about resources in a corresponding segment or portion of the cloud computing system 202. A security map is a lightweight model, schema, or mapping of the security information of a resource in a target segment or portion rather than a copy or summary of all resources. In some implementations, a security map includes the security context of one or more cloud environments, devices, identities, secrets (e.g., sensitive data), cloud applications, data classifications, access rights, common vulnerabilities and exposures (CVEs), development operations (DevOps), services, and/or external devices.

The proactive deployment impact system 210 can regularly update security maps. For example, the proactive deployment impact system 210 automatically updates a security map for a tenant every 1 week, 3 days, 24 hours, 12 hours, 1 hour, 30 minutes, 10 minutes, or 1 minute. In some instances, the proactive deployment impact system 210 generates and/or updates the security map for a tenant (or other segment) on demand or upon receiving a change request that would affect the tenant. Because a security map is a model representation of the security of a segment or portion rather than a graph of every resource property, the proactive deployment impact system 210 can quickly generate or update the security map.

In various implementations, the proactive deployment impact system 210 determines that the tenant security map 316 corresponds to the candidate changes 314. For example, the proactive deployment impact system 210 identifies the tenant and resources in the cloud computing system 202 that correspond to a change request. The proactive deployment impact system 210 may then identify those resources within the tenant security map 316. In some instances, the proactive deployment impact system 210 directly identifies the corresponding resources within the tenant security map 316.

In various implementations, the proactive deployment impact system 210 also identifies surrounding resources. For example, if a corresponding resource referenced in the change request belongs to a given node, the proactive deployment impact system 210 may identify nodes or resources that connect to or are otherwise affected by the corresponding resource.

In various implementations, the proactive deployment impact system 210 selects a subset security map that includes the necessary resources and surrounding resources that would be affected by the change. For example, the proactive deployment impact system 210 queries a security map database for the relevant map or table entries for the corresponding resources. By using a small subset of a security map, the proactive deployment impact system 210 can further reduce the size of data from the cloud computing system 202 that is being processed and analyzed to determine how a change request impacts the cloud computing system 202. In some implementations, the tenant security map 316 represents the subset of a fuller tenant security map, where the subset includes the resources, nodes, and/or edges impacted by a change request.

With a current version of the tenant security map 316 selected, which is based on the resources in a change request being impacted, the proactive deployment impact system 210 can perform the predictive risk assessment 320 to determine the security impacts of deploying the change. As illustrated, the predictive risk assessment 320 shows three actions. In some instances, a predictive risk assessment includes additional, fewer, or different actions.

The first action 322 in the predictive risk assessment 320 includes merging candidate changes with the current security map to generate a candidate security map. For instance, the proactive deployment impact system 210 generates a candidate security map that updates the security information of the resources, nodes, and/or edges as if the candidate change had been deployed in the cloud computing system 202.

In various implementations, the proactive deployment impact system 210 merges the candidate change into the current security map by compiling the changes to generate a security posture of the changes and combining the compiled file with the existing corresponding security posture from the security graph to identify the proposed changes.

In some instances, the proactive deployment impact system 210 utilizes a what-if call to merge the code-based infrastructure changes with the current corresponding code-based infrastructure. For example, the proactive deployment impact system 210 provides a what-if call with inputs of a resource group, the changes (e.g., a template file), and parameters to generate and output an object that indicates which security properties have changed to signal the security impact of deploying the changes.

In some implementations, the proactive deployment impact system 210 generates the candidate security map based on reading a structured data file (e.g., a JSON file) for the existing resource group of the current corresponding security map. The proactive deployment impact system 210 then iterates through the changes and retrieves before and after values for each change. In addition, the proactive deployment impact system 210 locates one or more corresponding resource objects in the structured data file and updates the resource object with the changes in the candidate security map. In some instances, the proactive deployment impact system 210 writes the modified data structure back to the corresponding target path. In these implementations, the proactive deployment impact system 210 stores the change results in a new folder or directory that represents the corresponding cloud infrastructure environment as if the candidate change had been deployed.

In various implementations, the proactive deployment impact system 210 runs one or more security assessments and/or configuration tools to determine new security changes from the candidate security map. For instance, the proactive deployment impact system 210 determines security misconfigurations by comparing the pre-deployment state to the post-deployment state to detect security changes.

In these instances, the comparison identifies new security misconfigurations introduced by the requested change.

The second act 324 of the predictive risk assessment 320 includes generating and evaluating breach paths in the candidate security map to discover attack paths (e.g., vulnerabilities awaiting exploitation). For example, the proactive deployment impact system 210 generates pattern-based data structures, such as node-based breach paths, from the changed resources and compares the pattern-based data structures to known vulnerability paths to search for attack paths (e.g., security risks), which are further described below in the next set of figures.

The third act 326 includes identifying a new security risk from a discovered attack path. In various implementations, the proactive deployment impact system 210 can determine attack paths introduced by implementing the candidate change. From these attack paths, the proactive deployment impact system 210 can determine new security risks that would be introduced by deploying the candidate changes. As further described below, while modifying a given resource may not create new security risks for the given resource, the modification may expose an indirectly connected resource to new vulnerabilities.

As also described below, the proactive deployment impact system 210 may detect different levels of security risks depending on the attack path type. For instance, the security risk may satisfy distinct threat thresholds or severity levels, triggering different response actions.

In one or more implementations, the proactive deployment impact system 210 generates and provides an impact assessment report 328. In some instances, the impact assessment report 328 indicates the new security risks, if any, detected from the candidate changes. In some instances, the impact assessment report 328 includes the severity of the new security risks. In some instances, the impact assessment report 328 provides preventative or proactive actions that the proactive deployment impact system 210 will take to protect against the security risks.

In various implementations, the proactive deployment impact system 210 performs proactive actions 330. The proactive actions 330 may vary based on the type of security risk. For instance, the proactive deployment impact system 210 may block or prevent the candidate change from being deployed. In some instances, the proactive deployment impact system 210 notifies the requesting system of the new security risks. In one or more implementations, the proactive deployment impact system 210 modifies the candidate change until the security risks are minimized or removed. Proactive actions will be further described below in connection with FIG. 5.

As mentioned above, FIGS. 4A-4D provide additional details about security graphs and pattern-based data structures. In particular, FIGS. 4A-4D illustrate example diagrams of security maps and pattern-based data structures based on requested candidate code-based infrastructure changes according to some implementations. More particularly, FIG. 4A illustrates a simplified security map, while FIG. 4B illustrates a simplified candidate security map. FIG. 4C illustrates a pattern-based data structure from an entry in the simplified security map, and FIG. 4D illustrates an updated version of the pattern-based data structure based on the simplified candidate security map.

FIG. 4A and FIG. 4B, as mentioned, show versions of an example security map. A security map may correspond to a segment of the cloud infrastructure environment of a cloud computing system, such as a tenant. In some implementations, the security map corresponds to smaller portions, such as a portion of a tenant. In one or more implementations, the proactive deployment impact system 210 provides queries to a security database to retrieve the relevant portion of a security map.

Additionally, as described above, a security map includes security information about corresponding resources. In particular, the security information may include security contexts, such as security risks, attack targets, connections, and lateral movement information. In some instances, a security map is organized by nodes and edges, where the nodes include cloud resources and the edges illustrate relationships between connected resources.

As mentioned, FIG. 4A includes a security map 400, and FIG. 4B includes a candidate security map 420. The security maps also include columns corresponding to a source identifier 402, a target node identifier 404, a source node property 406, a target node property 408, and a target node type 410. The rows correspond to a source node connected to a target node. For example, each security map includes a first row of Source Node A connected to Target Node B and a second row of Source Node X connected to Target Node Y.

In various implementations, the security map is organized in a different data structure. For example, the security map is a graph, a tree, or a table with one or more different entries. Regardless of the type of data structure used for the security map, the security map includes a model with security information about resources and not a representation of most or all of the characteristics and attributes of the resources. This lightweight approach enables faster processing and requires less memory storage.

In FIG. 4A, the security map 400 shows that Source Node A has cloud computing properties, and Target Node B has sensitive data within a key vault resource. Source Node X has CVE (common vulnerabilities and exposures) properties, and Target Node Y also has sensitive data within a storage account resource. While Source Node A has a CVE 412, it is protected from outside exposure, and the connection of Node A to the sensitive data within the storage account of Node B presents a maintained security risk.

While FIG. 4B shows the candidate security map 420 with a change to the second entry in the map based on alterations in the candidate change, the candidate change can include additional and/or different changes to the cloud environment. For instance, the candidate change includes a deployment action that removes the permissions of a breached service principal name (SPN) or adds another SPN with similar permissions.

Upon receiving the candidate change, the proactive deployment impact system 210 generates the candidate security map 420. As shown, Source Node A and Target Node B remain the same. However, the property of Source Node X updates from CVE 412 to CVE+Internet Exposure 414. For example, a modification in the candidate change unintentionally allows Node A to allow outside access, which causes an unwanted security risk.

In some instances, the change to a node is intentional. For example, a developer is trying to allow outside access to the node, believing that changing the security posture of the node would not have an adverse security effect. However, unbeknownst to the developer, the resource in the node may be connected via runtime properties to resources in adjacent nodes that include accessible sensitive data. As a result, the change may introduce vulnerabilities to these directly or indirectly connected nodes.

As described above, in various implementations, the proactive deployment impact system 210 determines the candidate security map by using a what-if call within the centralized platform to merge the code-based infrastructure changes with the current corresponding code-based infrastructure and indicates the changes to security information and/or resources in the candidate security map. For instance, the proactive deployment impact system 210 detects new risks by scanning the breach paths and/or security maps using a what-if analysis that returns the expected impact of the proposed changes. In some instances, the what-if analysis considers the submitting system's allowed visibility (e.g., a developer is not allowed to access the security status of an adjunct service that could cause an attack path). In various instances, the what-if analysis is based on the type of system requesting the candidate change (e.g., a recommendation what-if analysis or an attack disruption what-if analysis).

In some implementations, the proactive deployment impact system 210 generates the candidate security map as a new security map from the candidate change. For example, the proactive deployment impact system 210 generates a new security map from the candidate changes. As another example, the proactive deployment impact system 210 copies the existing security map and modifies the copy based on the requested changes to generate the candidate security map.

Based on the changes to the security maps, the proactive deployment impact system 210 determines whether the changes cause a security risk. In some implementations, the proactive deployment impact system 210 performs a predictive risk assessment on the entries or portions of the candidate security map that change. In various implementations, the proactive deployment impact system 210 performs a predictive risk assessment on all or many of the entries in the candidate security map.

In various implementations, the proactive deployment impact system 210 needs to parse or convert a source map into a format that is compatible with a security analysis that performs vulnerability searches and queries. In many cases, this includes a pattern-based data structure (e.g., breach path) such as a candidate network graph, with nodes representing infrastructure resources and edges representing the type of relationship between nodes. In various instances, the groups of nodes and edges form patterns and chains within the candidate network graph.

To illustrate, FIG. 4C shows the proactive deployment impact system 210 generating a pattern-based data structure, shown as a breach path 430 of the entry with Nodes X and Y. As shown, Node X has the CVE property and Node Y has the sensitive data property. In some instances, the breach path is a type of pattern-based data structure with nodes representing candidate infrastructure resources. In FIG. 4D, the candidate breach path 440 shows that Node X now includes Internet Exposure, which provides external access to Node X. The Internet Exposure to Node X carries to the CVE as well as to the sensitive data in Node Y, which is connected to Node X. Indeed, as shown in bold text, while the candidate change may only modify the properties of Node X, the adverse effects carry to the sensitive data in Node Y.

As described in connection with FIG. 5, the proactive deployment impact system 210 may detect new security risks based on the breach paths (e.g., evaluating attack paths). By doing so, the proactive deployment impact system 210 can detect that the candidate change introduces a new security risk and can take preventative actions to proactively stop the risks from being added to the cloud computing system. Additionally, the proactive deployment impact system 210 can detect attack paths that include external devices outside the cloud computing system.

While FIGS. 4A-4D provide one example of a candidate change that introduces a new security risk, candidate changes can inadvertently introduce several types of new risks. The proactive deployment impact system 210 can identify these new breaches based on runtime security information, such as the presence of data secrets or other sensitive data. For example, a user may need to provide login credentials to access a secure database, and a candidate change permitting users to access another resource may unintentionally allow some users to freely access the secure database.

As another example, a candidate change may move data once stored in a secure environment to another resource that is exposed to the internet. A candidate change may result in unintentional internet exposure of a cloud computing instance that contains a private key. A device may provide valid credentials to access a virtual machine (VM) that contains sensitive data and a candidate change may bypass the permission step, granting some users unrestricted access to the sensitive data. A storage account maintains sensitive data; however, a candidate change allows the sensitive data to be used for grounding a publicly accessible artificial intelligence (AI) application. This enables the AI model to divulge the sensitive data.

As mentioned above, the proactive deployment impact system 210 proactively detects security risks by applying predictive risk assessment to the pattern-based data structures (e.g., breach paths) to determine which paths are attack paths and the level of security threat they present. For example, in some instances, the proactive deployment impact system 210 runs an analysis of the original paths and candidate paths, comparing the analyses to determine whether the new paths trigger policy or attack security violations.

To elaborate, FIG. 5 illustrates an example diagram of preventing security resource breaches in a production cloud environment based on preventing security resource breaches in a production cloud environment based on performing security pattern analysis on security graphs and pattern-based data structures according to some implementations. As shown, FIG. 5 includes a series of acts 500 performed by the proactive deployment impact system 210.

As shown, the series of acts 500 includes act 502 of generating one or more breach paths from the candidate security map. In various implementations, the proactive deployment impact system 210 generates a breach path based on entries in the security map, as described above. For example, if a security map includes an entry with modified security information, the proactive deployment impact system 210 generates a breach path of the nodes included in the entry and/or the surrounding nodes.

In various implementations, creating breach paths or pattern-based data structures allows the proactive deployment impact system 210 to detect security risks. For example, generating the pattern-based data structure converts the candidate security map and/or candidate security maps into a format compatible with performing the security pattern analysis. As described above, the breach paths include nodes, some corresponding security properties, and connections between nodes.

As shown, the series of acts 500 also includes act 504 of performing a security pattern analysis on the one or more breach paths. For instance, the proactive deployment impact system 210 uses a security pattern analysis that uses predictive modeling to identify known, but often hidden, matches of vulnerability patterns within the one or more breach paths. As shown, the proactive deployment impact system 210 performs act 504 in connection with act 506 of accessing known resource vulnerability patterns. In some instances, the known resource vulnerability patterns correspond to tools, tactics, and procedures that attackers employ to exploit resources and gain unauthorized access to the target cloud computing system.

In various implementations, the security pattern analysis includes running or executing a set of queries that includes patterns of known resource vulnerabilities to determine if any of the breach paths include a match to a known resource vulnerability. For example, by traversing the breach paths, the proactive deployment impact system 210 runs the known resource vulnerability patterns against infrastructure resource pattern combinations from the breach paths to identify potential security threats based on matching resource vulnerability patterns.

In various implementations, the security pattern analysis includes a breach path analytics tool that identifies resource vulnerability patterns (e.g., resource vulnerability graph patterns), which include potential breach paths. For example, the breach path analytics tool maintains a collection of breach path patterns. In various implementations, the proactive deployment impact system 210 uses the breach path analytics tool to run breach path pattern queries against the different resource pattern combinations in the breach paths to identify matches (e.g., matches within a threshold value) indicating potential attack paths. In particular, breach path patterns help identify resource pivots that need further analysis for security breaches.

As mentioned above, because each breach path is a small fraction of the size of the production environment, the proactive deployment impact system 210 efficiently performs the security pattern analysis in real time. For example, while a security pattern analysis of the production environment often takes hours to days, the proactive deployment impact system 210 can perform a security pattern analysis of the test production environment on the fly when a candidate change is requested.

Upon determining a resource vulnerability pattern (e.g., potential attack path) in a pattern-based data structure, the proactive deployment impact system 210 can determine a security threat score. Act 508 includes determining security threat scores for resource vulnerability patterns based on the candidate security map.

As part of determining a security threat score for an identified resource vulnerability pattern, the proactive deployment impact system 210 determines which cloud resources are affected by the vulnerability. For example, the proactive deployment impact system 210 determines whether an identified resource vulnerability pattern includes horizontal and/or vertical movement. Horizontal movement refers to exposure within the same subscription identifier or resource group, while vertical movement refers to exposure across subscription identifiers, resource groups, or tenant identifiers.

To illustrate, in some cases, the proactive deployment impact system 210 uses a breach path analytics tool to identify breach paths, which reveal a pivot node at the end of the path. To determine a security threat score for the breach path, the proactive deployment impact system 210 needs to determine the blast radius of how many other cloud resources could be affected due to the vulnerable breach path. For example, upon detecting a VM node that has become vulnerable to internet exposure, the proactive deployment impact system 210 determines that the blast radius includes a storage node that includes sensitive data.

In various implementations, the proactive deployment impact system 210 can use additional and/or different security analytic tools on the one or more breach paths. For example, the proactive deployment impact system 210 detects new risks by scanning the breach paths and/or security maps using a what-if analysis or performing auto-path detection. In various implementations, the proactive deployment impact system 210 utilizes security backend services to detect attack paths from the breach path, including complex attack paths (e.g., attack paths that can originate from non-cloud devices, such as endpoints, and terminate in the cloud, such as at storage accounts) that would not be detected from the candidate change alone but can be detected when considered in connection with the runtime resources (through the candidate security map). By doing so, the proactive deployment impact system 210 can leverage multiple runtime risk detection tools already integrated into the cloud computing system.

In connection with act 508, act 510 includes accessing security threat score thresholds. In various implementations, the security threat score threshold corresponds to the amount of exposure that a resource vulnerability pattern creates in terms of horizontal and vertical movement. For example, the proactive deployment impact system 210 uses a blast radius to determine the potential impact of a candidate change. The blast radius may indicate the extent of risk or taint that is being propagated. In various implementations, the proactive deployment impact system 210 utilizes a spreading algorithm (e.g., a graph-based algorithm or a machine learning model that determines a blast radius using breach paths) to identify a blast radius.

For example, if the blast radius of a resource vulnerability pattern is limited to the same subscription identifier, the same resource group, and the same tenant identifier, then no security threat score thresholds are met, and the security threat score is low. A low security threat score corresponds to low risk, which should be expected.

In one example, if the blast radius of a resource vulnerability pattern crosses over between different resource groups but stays within the same subscription identifier and the same tenant identifier, then a resource vulnerability pattern meets a first security threat score threshold. Other instances may cause the first security threat score threshold to be met. In some instances, the first security threat score threshold corresponds to a medium security risk that should typically be avoided but may be considered expected behavior. For example, the first security threat score threshold indicates that while a breach path is not an attack path, it does violate one or more best practices policies (e.g., the security risk includes violating a best practices policy of the cloud infrastructure environment if the candidate code-based infrastructure was implemented).

If the blast radius crosses over between different subscription identifiers but stays within the same tenant identifier, then the resource vulnerability pattern meets a second, higher security threat score threshold. This higher security threat score may correspond to a high risk that should be avoided or blocked. For example, a candidate change causes resources associated with a first subscription identifier to be unintentionally accessed by a second subscription identifier, which meets at least the second security threat score threshold.

In some implementations, the proactive deployment impact system 210 determines that a breach path meets a third, even higher, security threat score threshold. For example, the blast radius of the potential attack crosses over between different tenant identifiers. Indeed, a critical security threat score corresponds to a very high risk that could result in significant harm or damage to customers and end users by permitting unauthorized access to cloud resources of another tenant identifier.

Using the security threat score thresholds, the proactive deployment impact system 210 can assign security threat scores to each identified resource vulnerability pattern. Because the security pattern analysis and security threat scores are determined before the candidate change is deployed, even high and critical security threat or risk scores will not introduce the corresponding security threats into the production environment.

Act 512 includes performing a security action based on a security threat score. Act 514 includes accessing security actions. In some implementations, the available security actions are based on customized policies associated with a user, administrator, or security team. In some implementations, the security actions correspond to a default set of actions. For example, the security actions can include blocking the candidate infrastructure changes from being deployed, modifying the candidate infrastructure code before modifying it (e.g., a task of the attack distribution system), or providing a notification of the change in security risk to a user.

In various implementations, the proactive deployment impact system 210 determines the type of security action to take based on the security threat score and/or the security threshold that was triggered. For example, if only low-security threat scores are found, the proactive deployment impact system 210 may log the security threat scores but take no further action (e.g., allow the candidate change to deploy). In some implementations, for low-security threat scores, the proactive deployment impact system 210 may respond with an indication of the risk.

In some implementations, the proactive deployment impact system 210 can notify, warn, and/or prevent the deployment of candidate changes that register a security threat score of medium or above. The proactive deployment impact system 210 can provide different levels of urgency based on whether the security threat score is medium, high, or critical (e.g., the system reports that a risky misconfiguration was found in the deployment request, which might result in dependencies being affected beyond the targeted scope of resources).

For example, for a candidate change with a medium security threat score, if deploying a candidate change would violate one or more best practices policies, the proactive deployment impact system 210 provides notification of the risk and/or allows the change to be deployed. In some implementations, the proactive deployment impact system 210 does not let a candidate change deploy if it violates a best practices policy. In addition, if the current environment has a high or critical security threat score indicating a new attack path, then the proactive deployment impact system 210 may prevent the candidate change from deploying in the cloud infrastructure environment. By doing so, the proactive deployment impact system 210 ensures that additional risk is not unknowingly added to the cloud computing system. In some implementations, the proactive deployment impact system 210 always reports high and/or critical security threat scores.

In various implementations, the proactive deployment impact system 210 provides a security threat notification if a resource vulnerability pattern has a security threat score that exceeds the current threat level of the environment. For example, the proactive deployment impact system 210 reports security threat scores that negatively change a security risk profile (e.g., the system reports that the security risk profile would increase (negatively change) because a storage container with sensitive data would become internet-exposed and publicly accessible).

As mentioned above, the proactive deployment impact system 210 may allow or prevent deployment in the active production environment based on the security threat scores of a candidate change. For example, the proactive deployment impact system 210 allows the candidate change to deploy if the highest detected security threat score for the candidate change is below a medium or high-level risk score. In various implementations, the proactive deployment impact system 210 prevents the candidate change from deploying if the security threat score is high or critical.

As a result of the proactive deployment impact system 210, requesting systems are able to deploy, remediate, and disrupt attacks faster and with higher accuracy before a deployment creates an otherwise undetected security risk. In addition, the information provided by the proactive deployment impact system 210, which often includes the reason behind the assessment, can be used to prioritize remediation steps to enable faster resolutions of correcting candidate changes that would introduce new security risks.

In one or more implementations, the proactive deployment impact system 210 provides a recommendation for updating the candidate change to remove or lower the risk score. For instance, the proactive deployment impact system 210 suggests and/or automatically applies remediation steps to address the issues creating the new security path (e.g., "Close network port 22 to prevent attackers from using the exfiltrated cryptographic network protocol key."). In addition, as described above, the proactive deployment impact system 210 may use an iterative process to ensure that the suggested changes themselves solve the targeted risk as well as not introduce additional security risks.

Figure 6A:
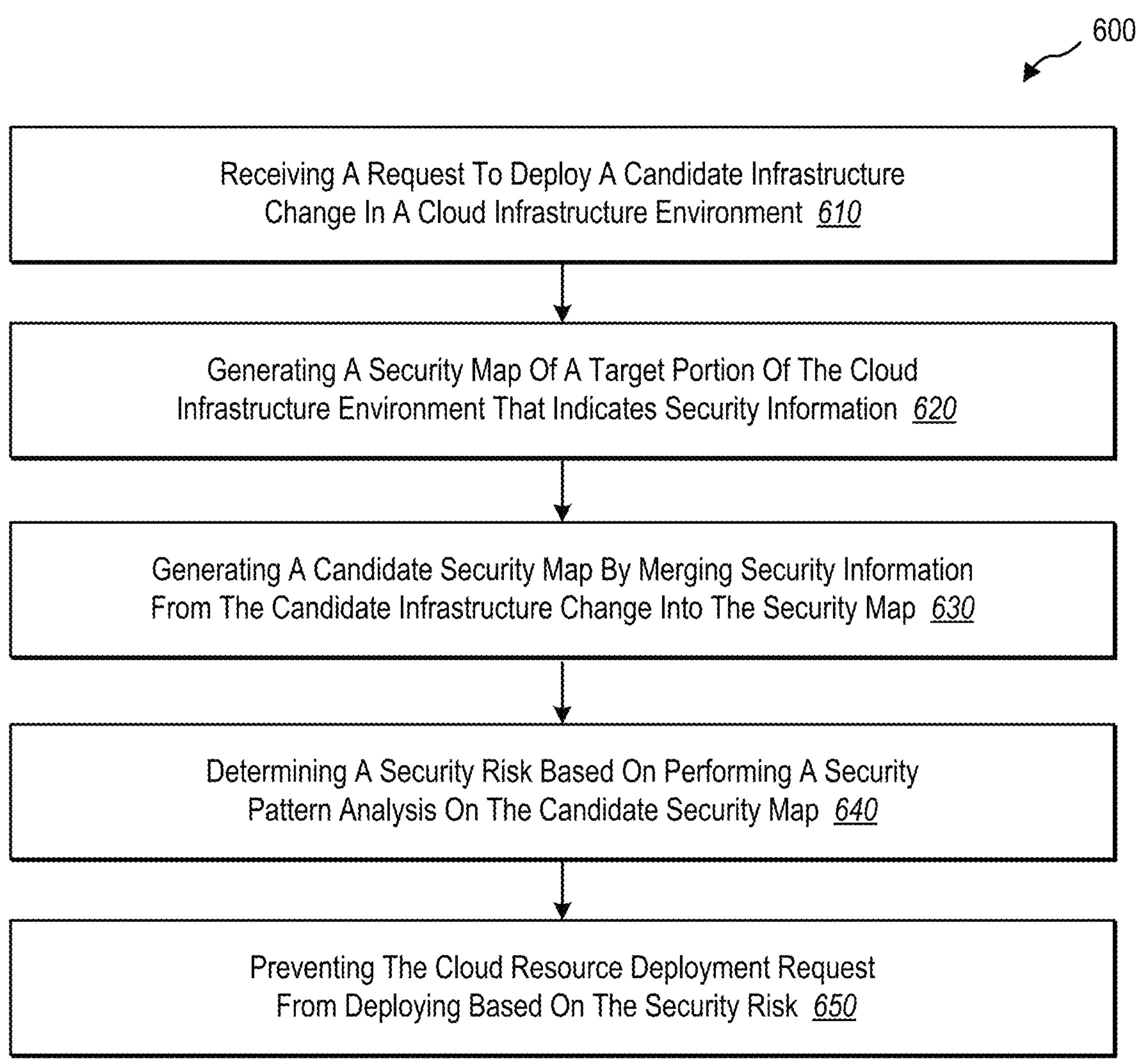
FIGS. 6A-6B illustrate example series of acts of computer-implemented methods for preventing resource breaches in a cloud computing system.
Figure 6B:
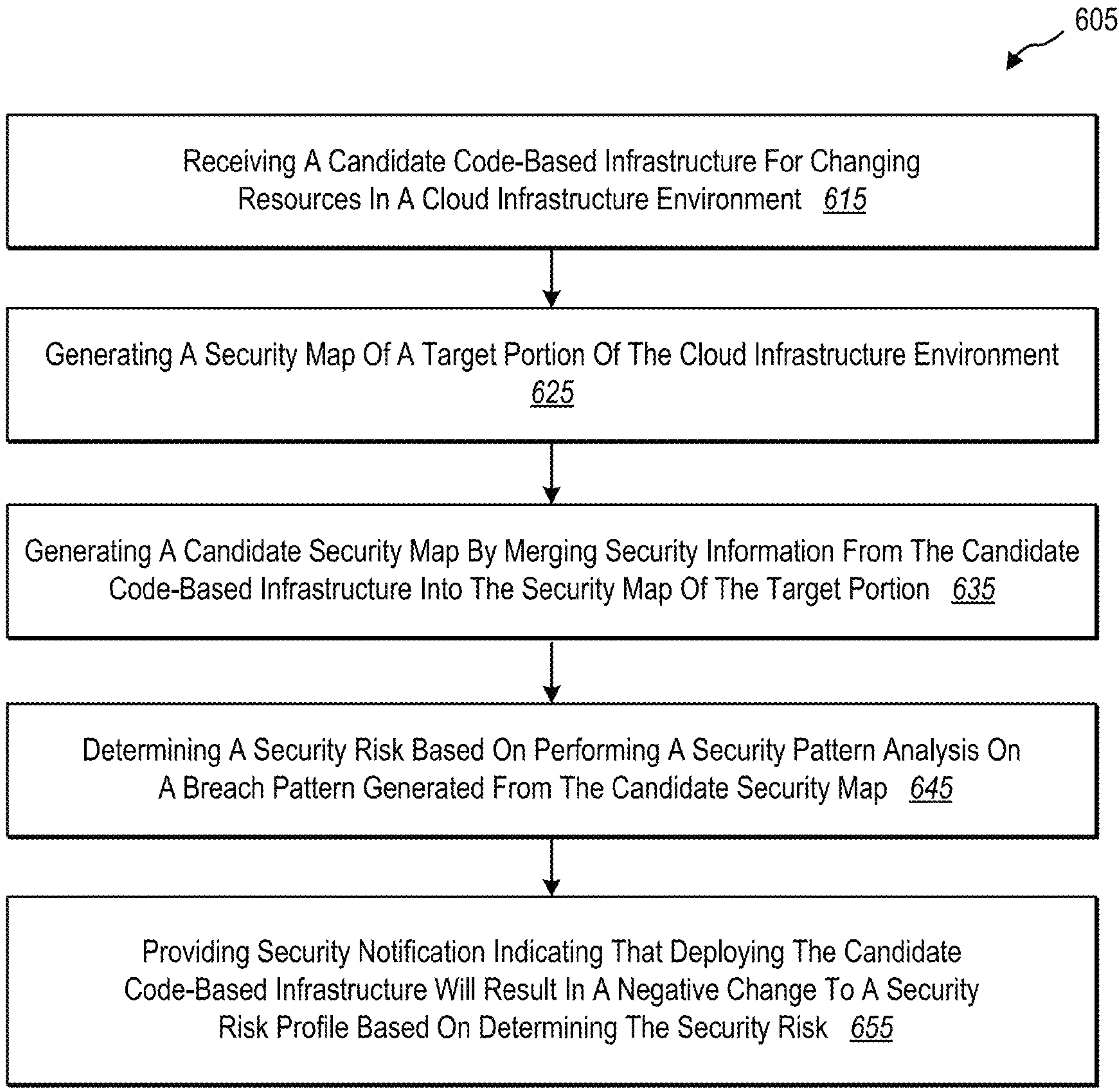

Turning now to FIGS. 6A-6B, these figures illustrate example series of computer-implemented methods for preventing resource breaches in a cloud computing system according to some implementations. While FIGS. 6A-6B illustrate acts according to one or more implementations, alternative implementations may omit, add to, reorder, and/or modify any of the acts shown. FIG. 6A includes a first series of acts 600, and FIG. 6B includes a second series of acts 605.

The acts in FIGS. 6A-6B can be performed as part of a method (e.g., a computer-implemented method). Alternatively, a computer-readable medium can include instructions that, when executed by a processing system with a processor, cause a computing device to perform the acts in FIGS. 6A-6B. In some implementations, a system (e.g., a processing system comprising a processor) can perform the acts in FIGS. 6A-6B. For example, the system includes a processing system and a computer memory, which includes instructions that, when executed by the processing system, cause the system to perform various actions or steps.

In FIG. 6A, the first series of acts 600 includes act 610 of receiving a request to deploy a candidate infrastructure change in a cloud infrastructure environment. For instance, in example implementations, act 610 involves receiving a cloud resource deployment request to deploy a candidate code-based infrastructure change in a cloud infrastructure environment. In some implementations, the cloud resource deployment request is provided as a code-based infrastructure file with corresponding parameters. In one or more implementations, the cloud resource deployment request is received from an administrator device, a client device associated with a developer, or a recommendation system.

As further shown, the first series of acts 600 includes act 620 of generating a security map of a target portion of the cloud infrastructure environment that indicates security information. For instance, in example implementations, act 620 involves generating a security map of a target portion of the cloud infrastructure environment that indicates the security information of nodes and edges within the target portion. In some implementations, the security information of a node includes security contexts and security risks of the node.

As further shown, the first series of acts 600 includes act 630 of generating a candidate security map by merging security information from the candidate infrastructure change into the security map. For instance, in example implementations, act 630 involves generating a candidate security map by merging security information from the candidate code-based infrastructure change into the security map based on determining that the cloud resource deployment request corresponds to the target portion.

In some implementations, act 630 includes determining a target resource within the cloud resource deployment request, identifying the target resource within the target portion of the cloud infrastructure environment, and obtaining the security map for the target portion. In some implementations, the target portion corresponds to a target tenant of the cloud infrastructure environment, and the security map is a subset of a target tenant security map. In some implementations, a security map is stored as a table in a security database. In one or more implementations, merging the security information from the candidate code-based infrastructure change into the security map includes identifying target cloud resources and surrounding target cloud resources affected by a change within the candidate code-based infrastructure change, identifying changes from the candidate code-based infrastructure change to the target cloud resources and the surrounding target cloud resources, and generating the candidate security map to indicate updated security information to the nodes and the edges within the target portion based on the changes.

As further shown, the first series of acts 600 includes act 640 of determining a security risk based on performing a security pattern analysis on the candidate security map. For instance, in example implementations, act 640 involves determining a security risk based on performing a security pattern analysis on one or more breach patterns generated from the candidate security map. In various implementations, performing the security pattern analysis includes performing a what-if analysis on the candidate security map that provides the expected impacts of implementing the candidate code-based infrastructure change.

In some implementations, in connection with act 640, determining the security risk includes comparing pattern-based data structures from the security map to the one or more pattern-based data structures generated from the candidate security map to determine changes in the security information. In one or more implementations, performing the security pattern analysis includes comparing a set of known resource vulnerability patterns to the one or more pattern-based data structures and identifying a match between a resource vulnerability pattern of the set of known resource vulnerability patterns and the one or more pattern-based data structures.

In various implementations, act 640 includes providing a security threat notification based on determining that the security risk meets a security threat threshold. In some instances, the security threat threshold is based on a current threat level of a subscription identifier or a tenant identifier associated with the target portion of the cloud infrastructure environment, and the security threat threshold is met based on the one or more pattern-based data structures generated from the candidate security map having a threat level above the current threat level. In some instances, the security threat threshold is met based on the one or more pattern-based data structures generated from the candidate security map having a critical breach threat level.

In some implementations, in connection with act 640, the security risk would introduce a new vulnerability into the cloud infrastructure environment if the candidate code-based infrastructure is implemented. In various implementations, the security risk violates a best practices policy of the cloud infrastructure environment if the candidate code-based infrastructure is implemented. In one or more implementations, act 640 includes generating the pattern-based data structure from the candidate security map into a pattern-based data structure by converting a portion of the candidate security map into a format that is compatible with performing the security pattern analysis.

As further shown, the first series of acts 600 includes act 650 of preventing the cloud resource deployment request from deploying based on the security risk. For instance, in example implementations, act 650 involves preventing the cloud resource deployment request from deploying in the cloud infrastructure environment based on determining the security risk.

In some instances, the first series of acts 600 includes additional and/or different actions. For example, the first series of acts 600 includes receiving an additional cloud resource deployment request, generating an additional candidate security map from additional security information in the additional cloud resource deployment request based on determining that the additional cloud resource deployment request corresponds to the target portion, determining that the additional cloud resource deployment request includes a low-security risk based on performing the security pattern analysis with the candidate security map, and allowing the additional cloud resource deployment request to deploy in the cloud infrastructure environment based on the low-security risk.

In FIG. 6B, the second series of acts 605 includes act 615 of receiving a candidate code-based infrastructure for changing resources in a cloud infrastructure environment. For instance, in example implementations, act 615 involves receiving a candidate code-based infrastructure for changing resources in a cloud infrastructure environment.

As further shown, the second series of acts 605 includes act 625 of generating a security map of a target portion of the cloud infrastructure environment. For instance, in example implementations, act 625 involves generating a security map of a target portion of the cloud infrastructure environment.

As further shown, the second series of acts 605 includes act 635 of generating a candidate security map by merging security information from the candidate code-based infrastructure into the security map of the target portion. For instance, in example implementations, act 635 involves generating a candidate security map by merging security information from the candidate code-based infrastructure into the security map of the target portion.

As further shown, the second series of acts 605 includes act 645 of determining a security risk based on performing a security pattern analysis on a breach pattern generated from the candidate security map. For instance, in example implementations, act 645 involves determining a security risk based on performing a security pattern analysis on a breach pattern generated from the candidate security map.

As further shown, the second series of acts 605 includes act 655 of providing a security notification indicating that deploying the candidate code-based infrastructure will result in a negative change to a security risk profile based on determining the security risk. For instance, in example implementations, act 655 involves providing a security notification indicating that deploying the candidate code-based infrastructure will result in a negative change to a security risk profile based on determining the security risk.

Figure 7:
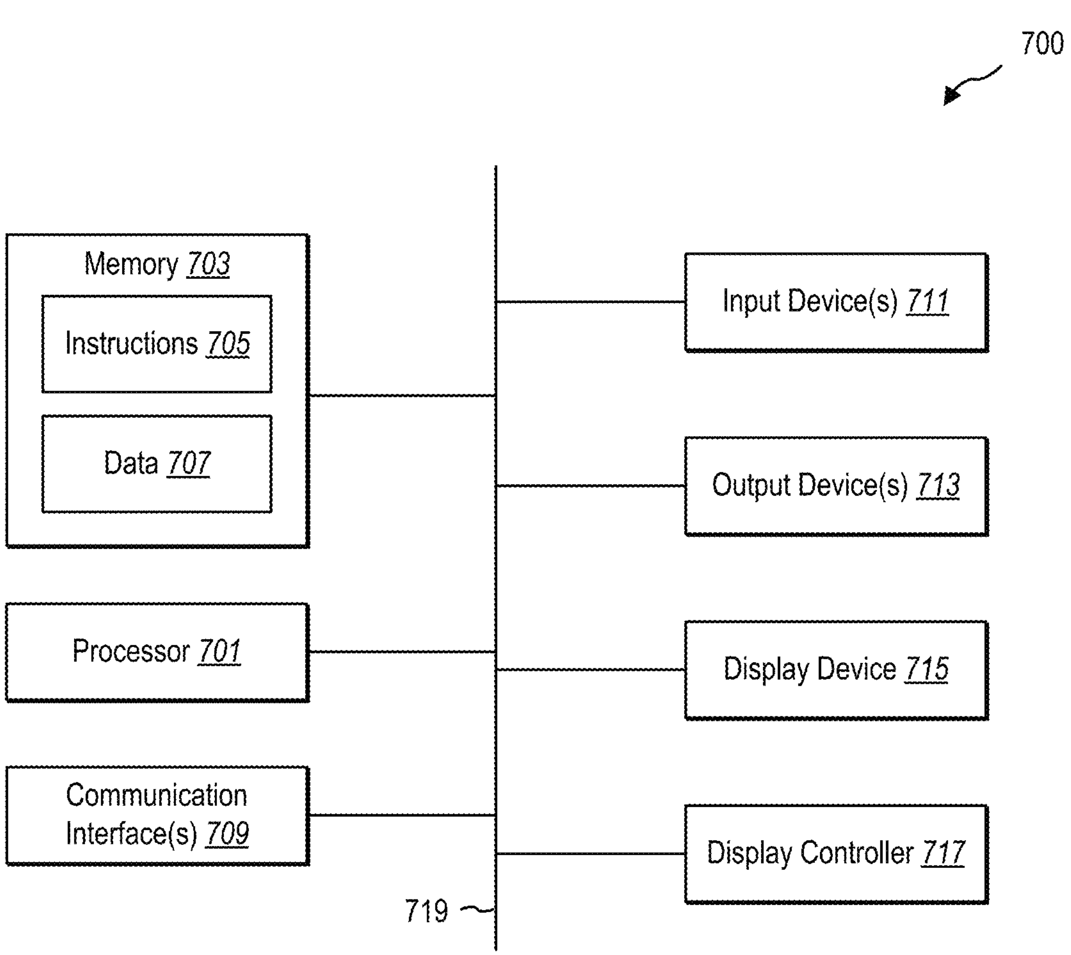
FIG. 7 illustrates example components included within a computer system that implements the proactive deployment impact system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 stored in the memory 703. Any of the various examples of modules and components described herein may be implemented, partially or wholly, as instructions 705 stored in memory 703 and executed by the processor 701. Any of the various examples of data described herein may be among the data 707 stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided to convert data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system within the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry the required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or another data link that enables the transportation of electronic data between respective client devices and components (e.g., server devices and/or virtual machines thereon) of the cloud computing system.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Furthermore, upon reaching various computer system components, program code means in the form of computer-executable instructions or data structures can be automatically transferred from transmission media to non-transitory computer-readable storage media (devices), or vice versa. For example, computer-executable instructions or data structures received over a network or data link can be buffered in random-access memory (RAM) within a network interface module (NIC) and then eventually transferred to computer system RAM and/or to less volatile computer storage media (devices) at a computer system. Thus, it should be understood that computer-readable storage media (devices) can be included in computer system components that also (or even primarily) utilize transmission media.

The disclosure may be practiced in network computing environments with many types of computer system configurations, including personal computers, desktop computers, laptop computers, message processors, handheld devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available medium that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage, or other magnetic storage devices, or any other medium that can be used to store desired program code means in the form of computer-executable instructions or data structures and that can be accessed by a general-purpose or special-purpose computer.

The steps and/or actions of the methods described herein may be interchanged with one another without departing from the scope of the claims. In other words, unless a specific order of steps or actions is required for the proper operation of the method being described, the order and/or use of specific steps and/or actions may be modified without departing from the scope of the claims.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for preventing resource breaches in a cloud computing system, comprising:

receiving a cloud resource deployment request to deploy a candidate code-based infrastructure change in a cloud infrastructure environment;

generating a security map of a target portion of the cloud infrastructure environment that indicates security information of nodes and edges within the target portion;

based on determining that the cloud resource deployment request corresponds to the target portion, generating a candidate security map by merging security information from the candidate code-based infrastructure change into the security map;

determining a security risk based on performing a security pattern analysis on one or more pattern-based data structures generated from the candidate security map; and based on determining the security risk:

deploying changes from the candidate code-based infrastructure change to the cloud infrastructure environment; or preventing the cloud resource deployment request from deploying in the cloud infrastructure environment.

2. The computer-implemented method of claim 1, wherein performing the security pattern analysis includes performing a what-if analysis on the candidate security map that provides expected impacts of implementing the candidate code-based infrastructure change.

3. The computer-implemented method of claim 1, further comprising:

determining a target resource within the cloud resource deployment request;

identifying the target resource within the target portion of the cloud infrastructure environment, wherein the target portion corresponds to a target tenant of the cloud infrastructure environment; and obtaining the security map for the target portion, wherein the security map is a subset of a target tenant security map.

4. The computer-implemented method of claim 3, wherein the security map is stored as a table in a security database.

5. The computer-implemented method of claim 1, wherein merging the security information from the candidate code-based infrastructure change into the security map includes:

identifying target cloud resources and surrounding target cloud resources affected by a change within the candidate code-based infrastructure change;

identifying the changes from the candidate code-based infrastructure change to the target cloud resources and the surrounding target cloud resources; and generating the candidate security map to indicate updated security information to the nodes and the edges within the target portion based on the changes.

6. The computer-implemented method of claim 1, wherein determining the security risk includes comparing pattern-based data structures from the security map to the one or more pattern-based data structures generated from the candidate security map to determine changes in the security information.

7. The computer-implemented method of claim 1, wherein performing the security pattern analysis includes:

comparing a set of known resource vulnerability patterns to the one or more pattern-based data structures; and identifying a match between a resource vulnerability pattern of the set of known resource vulnerability patterns and the one or more pattern-based data structures.

8. The computer-implemented method of claim 1, further comprising providing a security threat notification based on determining that the security risk meets a security threat threshold.

9. The computer-implemented method of claim 8, wherein:

the security threat threshold is based on a current threat level of a subscription identifier or a tenant identifier associated with the target portion of the cloud infrastructure environment; and the security threat threshold is met based on the one or more pattern-based data structures generated from the candidate security map having a threat level above the current threat level.

10. The computer-implemented method of claim 8, wherein the security threat threshold is met based on the one or more pattern-based data structures generated from the candidate security map having a critical breach threat level.

11. The computer-implemented method of claim 1, wherein the cloud resource deployment request is received from an administrator device, a client device associated with a developer, or a recommendation system.

12. The computer-implemented method of claim 1, wherein the cloud resource deployment request is provided as a code-based infrastructure file with corresponding parameters.

13. The computer-implemented method of claim 1, wherein the security information of a node includes security contexts and security risks of the node.

14. The computer-implemented method of claim 1, further comprising:

receiving an additional cloud resource deployment request;

based on determining that the additional cloud resource deployment request corresponds to the target portion, generating an additional candidate security map from additional security information in the additional cloud resource deployment request;

determining that the additional cloud resource deployment request includes a low-security risk based on performing the security pattern analysis with the candidate security map; and deploying the additional cloud resource deployment request in the cloud infrastructure environment based on the low-security risk.

15. A system for preventing resource breaches in a cloud computing system comprising:

a processing system having a processor; and a computer memory including instructions that, when executed by the processing system, cause the system to carry out operations comprising:

receiving a candidate code-based infrastructure change for changing resources in a cloud infrastructure environment;

generating a security map of a target portion of the cloud infrastructure environment;

generating a candidate security map by merging security information from the candidate code-based infrastructure change into the security map of the target portion;

determining a security risk based on performing a security pattern analysis on a pattern-based data structure generated from the candidate security map; and based on determining the security risk;

deploying changes from the candidate code-based infrastructure change to the cloud infrastructure environment; or providing a security notification indicating that deploying the candidate code-based infrastructure change will result in a negative change to a security risk profile.

16. The system of claim 15, wherein the security risk introduces a new vulnerability into the cloud infrastructure environment if the candidate code-based infrastructure change is implemented.

17. The system of claim 15, wherein the security risk violates a best practices policy of the cloud infrastructure environment if the candidate code-based infrastructure change is implemented.

18. The system of claim 15, further comprising generating the pattern-based data structure from the candidate security map into a pattern-based data structure by converting a portion of the candidate security map into a format that is compatible with performing the security pattern analysis.

19. A non-transitory computer-readable storage medium comprising instructions that, when executed by a processor, cause a computer device to carry out operations comprising:

receiving a cloud resource deployment request with a candidate code-based infrastructure change for changing resources within a cloud infrastructure environment;

generating a security map of a target portion of the cloud infrastructure environment that indicates security information of nodes and edges within the target portion;

based on determining that the cloud resource deployment request corresponds to the target portion, generating a candidate security map by:

identifying target cloud resources and surrounding target cloud resources affected by a change within the candidate code-based infrastructure change;

identifying changes from the candidate code-based infrastructure change to the target cloud resources and the surrounding target cloud resources; and generating the candidate security map to indicate updated security information to the nodes and the edges within the target portion based on the changes;

determining a security risk based on performing a security pattern analysis on one or more pattern-based data structures generated from the candidate security map; and based on determining the security risk:

deploying the changes from the candidate code-based infrastructure change to the cloud infrastructure environment; or preventing the cloud resource deployment request from deploying in the cloud infrastructure environment.

20. The non-transitory computer-readable storage medium of claim 19, wherein performing the security pattern analysis includes:

comparing a set of known resource vulnerability patterns to the one or more pattern-based data structures; and identifying a match between a resource vulnerability pattern of the set of known resource vulnerability patterns and the one or more pattern-based data structures.

* * * * *